United States Patent [19]

Weaver

[11] 3,825,210

[45] July 23, 1974

[54] CARRIER FOR PNEUMATIC TUBE SYSTEMS

[76] Inventor: Peter Brinkerhoff Weaver, 5 Brushwood Ct., Don Mills, Ontario, Canada

[22] Filed: Feb. 8, 1973

[21] Appl. No.: 330,490

[52] U.S. Cl. .............................................. 243/34
[51] Int. Cl. .......................................... B65g 51/06
[58] Field of Search ........................ 243/32, 34, 39

[56] References Cited
UNITED STATES PATENTS

| 242,459 | 6/1881 | Leayeraft | 243/34 |
| 2,251,238 | 7/1941 | Busch | 243/34 |
| 3,593,948 | 7/1971 | McClellan | 243/34 |

FOREIGN PATENTS OR APPLICATIONS

| 994,291 | 6/1965 | Great Britain | 243/39 |
| 1,018,217 | 1/1966 | Great Britain | 243/39 |

*Primary Examiner*—Richard A. Schacher
*Assistant Examiner*—Hadd Lane

[57] ABSTRACT

The invention relates to a carrier for transporting articles through pneumatic tube systems. The carrier has first and second shells disposed about a longitudinal axis and connected by hinges such that the shells are moved transversely relative to one another when opening and closing the carrier. A pair of ring seals are provided intermediate the ends of the carrier for guiding the carrier through a pneumatic tube system and for limiting air seepage past the carrier. End portions of the carrier are tapered to terminate in bumpers and a pair of latches are coupled to the shells for retaining the carrier in a closed position. A lock is provided for combining with the closed shells to prevent unauthorized opening of the carrier.

9 Claims, 6 Drawing Figures

PATENTED JUL 23 1974 3,825,210

CARRIER FOR PNEUMATIC TUBE SYSTEMS

This invention relates to a carrier for transporting articles through pneumatic tube systems.

Pneumatic tube systems are used to transport various items in carriers around buildings such as hospitals, high rise office complexes and the like. In most instances, the tube system is partially evacuated at one or more outlets so that air is inspired through inlets in the system and drawn from the inlets to the outlets. However, pressurized systems are also used. By arranging for a suitable movement of air between stations, it is possible to use the moving air to transport carriers between stations. The system commonly includes bends and line selectors for routing the carrier about the building. Consequently, the carrier must be designed to negotiate the bends and selectors.

There are numerous criteria used in designing a carrier for pneumatic systems. The carrier should preferably be light, inexpensive and foolproof. Also, the carrier should be arranged so that it cannot be entered into a tube system when in an open position or open while in the tube. Such an arrangement ensures that the carrier is closed before it is entered into the system thereby limiting the possibilities that the carrier contents will be lost in the system and that the carrier will become lodged in the system. The carrier should preferably also be capable of carrying a maximum length of materials around given bends in the system and be capable of being locked in a closed position.

According to a particular embodiment of the present invention, a carrier is provided having first and second shells disposed about a longitudinal axis and connected by hinges such that the shells are moved transversely relative to one another when opening and closing the carrier. A pair of ring seals are provided intermediate the ends of the carrier for guiding the carrier through a pneumatic tube system and for limiting air seepage past the carrier. End portions of the carrier are tapered to terminate in bumpers and a pair of latches are coupled to the shells for retaining the carrier in a closed position. A lock is provided for combining with the closed shells to prevent unauthorized opening of the carrier.

The invention will be better understood with reference to the drawings, in which.

Figures 1, 1A:
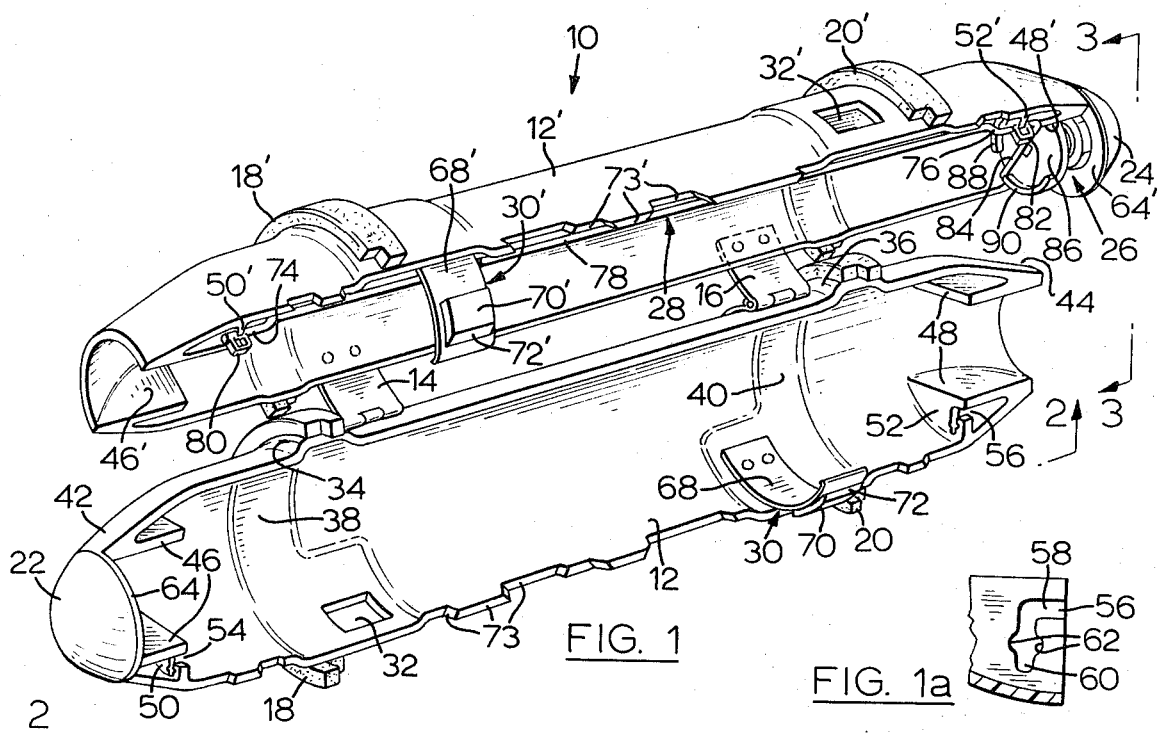
FIG. 1 is a perspective view of a carrier according to the invention and illustrated in an open position.
FIG. 1a is an end view of a portion of the carrier.
Figure 2:
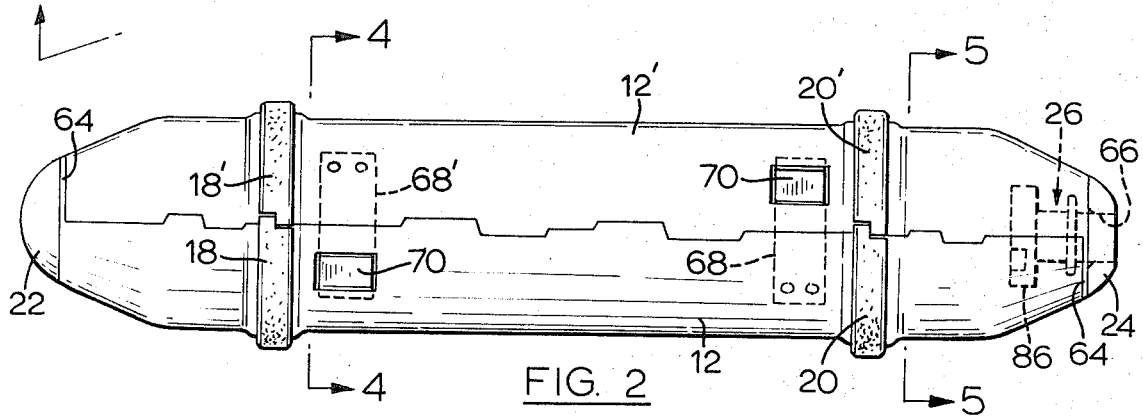
FIG. 2 is a view on line 2—2 of FIG. 1 showing the carrier in a closed position.

Reference is made to the drawings with particular reference to FIG. 1 which shows a carrier 10 consisting of first and second shells 12, 12' which extend longitudinally and which are interconnected by transversely mounted hinges 14, 16. Pairs of ring seal halves 18, 18' and 20, 20' are attached to the shells 12, 12' for guiding the carrier through a pneumatic tube system. These seals also limit air seepage past the carrier. Ends of the carrier are defined by respective resilient bumpers 22, 24, the latter of which houses an axially disposed tumbler lock 26 for moving an elongated lock bar 28 between release and lock positions. As will be described, the lock bar 28 is operable to lock the shell 12 to the shell 12' with the carrier in a closed position as shown in FIG. 2. A pair of spring latches 30, 30' are provided on respective shells 12, 12' for engagement in respective rectangular openings 32' and 32 formed in the shells.

The shells 12, 12' are substantially identical in shape and are preferably moulded in the same mould from a suitable plastic material such as LEXAN (a trade mark for a polycarbonate plastic sold by The Canadian General Electric Co.). In order to simplify description, parts of shell 12 will be described and corresponding parts of shell 12' will be given primed numerals. The shell 12 is generally semi-cylindrical over the major portion of its length and defines a pair of raised portions 34, 36 which also form respective internal radial depressions 38, 40. The purposes of the portions are threefold. Firstly, the ring seal halves are located on these portions; secondly they rigidify the moulded shells and thirdly the corresponding depressions 38, 40 house parts of the latches 30, 30' to minimize interference with contents of the carrier. The portions 34, 36 (and hence the ring seals) are positioned intermediate the ends of the carrier at positions which maximize the available length and diameter dimensions of the carrier. The shell 12 further includes tapered or frusto-conical end portions 42, 44 which meet outward extremities of pairs of axially aligned webs 46, 48. A pair of transverse webs 50, 52 extend one from each of two corresponding axial webs 46, 48 and terminate at respective end portions 42, 44. Respective L-shaped recesses 54, 56 are formed in the transverse webs 50, 52 and are shaped as shown in FIG. 1a. In this figure the recess 56 is shown and consists of a transversely extending mouth 58 leading into a generally radial slot 60 which defines a pair of transversely aligned detents 62, the purpose of which will be described.

The webs 46, 46' and 48, 48' are useful for locating contents as will be described. However, these webs also rigidify the ends of the carrier and act as buffers for contents which may move longitudinally in the carrier. Without these webs, there is a possibility that the contents would impact the conical end portions and tend to open the shells.

The resilient bumper 22 is adhesively secured to a disc-like end wall 64 and the bumper 24 is adhesively secured to a similar end wall 64'. Each of the end walls 64, 64' defines a central opening suitable for receiving conventional tumbler lock 26 and the bumper 24 defines an axial opening 66 containing an outer portion of the tumbler lock 26. Each of the bumpers is preferably larger than half the diameter of the pneumatic tube to avoid possible jamming of one container with a second container in the pneumatic tube.

As seen in FIGS. 1 and 2, the pairs of ring seal halves 18, 18' and 20, 20' have interengageable labyrinth ends for better sealing when the carrier is in a pneumatic tube. A suitable felt material is used to make the seal halves which are cut from a sheet of the material such that moisture will tend to cause dimension changes substantially longitudinally of the carrier rather than radially. The seal halves are adhesively attached to the shells at respective raised portions 34, 34' and 36, 36'.

Figures 3, 4, 5:
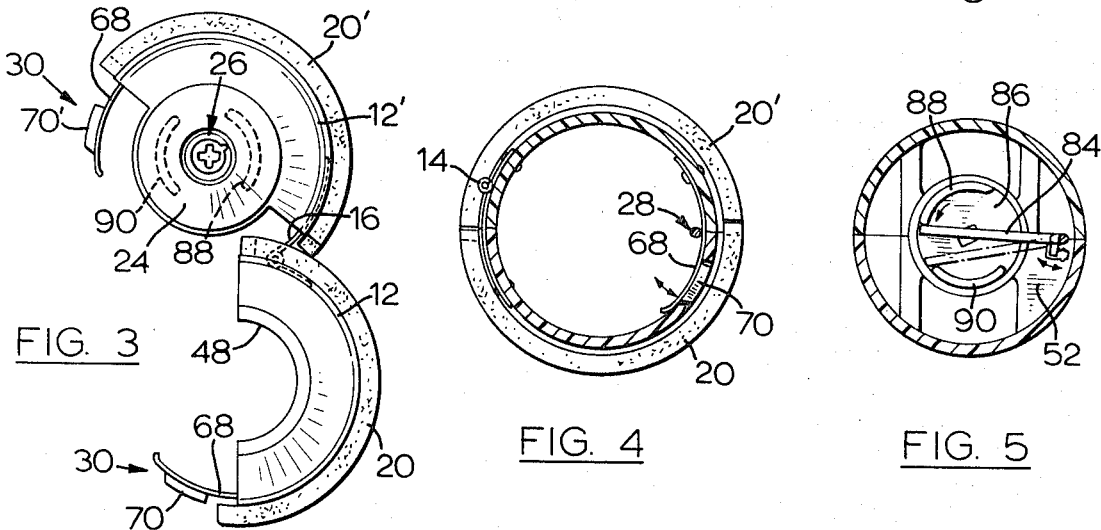
FIG. 3 is an end view of the carrier on line 3—3 of FIG. 1.
FIG. 4 is a sectional end view of the carrier on line 4—4 of FIG. 2.
FIG. 5 is a sectional end view of the carrier on line 5—5 of FIG. 2.

Hinges 14, 16 are preferably riveted to the shells 12, 12' and (as shown in FIG. 3) the pivot points of the hinges are offset from mating edges of the shells to permit the labyrinth ends of the ring seal halves to separate without damage to the seal halves. The hinges 14, 16 are preferably located immediately adjacent respective ring seal halves 18, 18' and 20, 20' (either between the halves as shown or outside the halves adjacent ends of the carrier) so that the hinges will not touch the tube wall while going around a bend in the tube.

Spring latches 30, 30' are attached to respective shells 12, 12' inside radial depressions 40, 38' to allow the spring latches 30, 30' to operate without interference even with a full diameter load. The latches consist of respective curved leaf springs 68, 68' riveted at respective inner ends thereof to shells 12, 12'. Outer ends of the springs 68, 68' carry respective radial projections 70, 70' adapted to engage in respective shell openings 32', 32 to retain the shells 12, 12' in a closed position as shown in FIGS. 2 and 4. The projections 70, 70' have respective inclined leading faces 72, 72' for deflecting the projections radially inwards as the shells 12, 12' are brought together. As the shells move into a closed position, the projections 70, 70' move radially outwards into respective openings 32', 32 and radial rear faces of the projections engage corresponding sides of the openings to retain the shells 12, 12' in the closed position. One major advantage of this arrangement is that the closing of the shells is a natural action and requires no teaching. Anyone wishing to close the carrier will naturally bring the shells together resulting in a snap-action as the latches move into the openings 32, 32'.

Respective longitudinal edges of the shells 12, 12' define interlocking recesses and projections indicated generally by the numerals 73, 73'. These edges locate the shells relative to one another when the shells are in the closed position. Also, because of their shape, the projections 73, 73' align corresponding edges of the shells on closing the carrier and also prevent closing the carrier unless the contents are entirely inside the shells. A sheet of paper projecting out of the shells will be sufficient to prevent closure if the sheet is engaged by these projections. Further advantages of these projections include increased torsional stability because of the interlocking arrangement; and an incidental advantage that because a carrier which is not completely closed will not fit into a pneumatic tube, an operator is forced to ensure that none of the contents project out of the carrier.

Reference is again made to FIG. 1 to describe the tumbler lock 26 and lock bar 28 which is operably coupled to the lock 26. The bar can be moved by the lock to retain the shells 12, 12' in a closed position so that only authorized persons having a key for the lock 26 can open the carrier. The bar 28 is adapted to snap into detents in webs 50', 52' formed in the shell 12'. These detents correspond in shape to the detents 62 shown in FIG. 1a. End portions 74, 76 of the bar 28 are engaged in the detents and are jogged radially inwards with respect to a main portion 78 of the bar. This limits possible interference between the bar 78 and contents of the carrier. However, in forming this jog, care must be taken to ensure that the bar 28 does not interfere with the latches 30, 30'. A pair of U-shaped elements 80, 82 are welded to respective bar portions 74, 76 and straddle respective webs 52', 50' for engagement in respective L-shaped recesses 54, 56 formed in shell 12. When the shells 12, 12' are closed, the elements 80, 82 enter respective recesses 54, 56 in shell 12 as shown in FIG. 5. The bar 28 also includes a transverse portion 84 which extends substantially at right angles to the remainder of the bar for co-operation with the circular cam plate 86 coupled to the lock 26.

The transverse portion 84 of the bar 28 extends substantially diametrically across the cam plate 86 for co-operation with first and second raised ribs 88, 90. These ribs extend about portions of the periphery of the plate 86 and project axially away from the surface of the plate. The relative positions of the ribs 88, 90 are shown in FIGS. 3 and 5.

In FIG. 3, the cam plate is in a position corresponding to a release position of lock 26 whereas in FIG. 5, the cam plate is at a point between the release and a locked position. This locked position which is shown in ghost outline corresponds to the U-shaped elements 80, 82 being engaged in portions of recesses 54, 56 corresponding to slot 60 shown in FIG. 1a.

The cam plate ribs 88, 90 are arranged to combine with transverse portion 84 of lock bar 28 such that when a key is inserted in the tumbler lock 26, the key must be turned through approximately 90° when either locking or unlocking the carrier.

The spring latches 30, 30' are operated when opening the carrier. Radial projections 70, 70' are accessible from outside the carrier through respective shell openings 32', 32. When the user applies a force to these projections the leaf springs 68, 68' are deflected radially inwards thereby moving the projections out of the shell openings so that the shells 12, 12' can be separated. The relative positions of the latches 30, 30' are such that in the event that one of the latch projections is struck accidentally, there is little likelihood that the other projections will also be struck because the projections are spaced apart both longitudinally and circumferentially.

In use, it will be evident that unless the shells 12, 12' are closed, the carrier cannot be entered into a pneumatic tube. This is a significant advantage of the carrier because in the past it has been possible to enter carriers into a tube without first closing the carrier. This may result in losing the contents of the carrier within the pneumatic tube system or in fouling the system to the extent that it no longer functions satisfactorily. Once the shells 12, 12' are brought together so that the projections 70, 70' engage in respective openings 32, 32', the carrier can be locked by inserting a key in the tumbler lock 26 and turning the key through about 90°. The carrier can then be opened only by further use of the key.

In some tube installations, it may be unnecessary to use the tumbler lock 26 and associated lock bar. In this event, these parts are not used, and a bumper similar to bumper 22 is placed on the carrier in place of bumper 24. Similarly, in some circumstances it may be preferable to use a carrier which will always be closed by a tumbler lock 26. In such circumstances it is possible to dispense with the latches 70, 70' in which case the openings 32', 32 would either be omitted or sealed from the inside of the carrier. In general, closure means is provided for retaining the shells 12, 12' in a closed position. The closure means may be the spring latches 30, 30', the lock 26 and bar 28 or a combination of the latches and lock.

Carrier 10 is capable of carrying drawings, X-ray negatives and the like in a positive location within the carrier. Preferably, the drawings to be carried are of a length such that when the drawings are in a rolled condition the ends fit between respective pairs of axial webs 46, 46' and 48, 48' so that when the carrier is closed, the drawings are located positively to obviate the possibility of damage. Also, if fragile objects are to be placed in the carrier, these objects can be mounted in a container which is adapted to locate between the webs 46, 46' and 48, 48' thereby limiting the possibility of damage to the contents as the carrier passes through the pneumatic tube system.

Because the shells 12, 12' are substantially identical, they are made in the same mould. This reduces moulding costs significantly.

It will be appreciated that although the above description is limited to a generally cylindrical carrier, the invention is applicable to carriers having any suitable cross-section. For instance, carriers having a generally oval cross-section have been used, and the invention is intended for use in carriers of this and other shapes.

We claim:

1. A carrier for transporting articles through tubes of a pneumatic tube system, the carrier being generally cylindrical and disposed about a longitudinal axis, the carrier comprising;

first and second shells for engagement one with the other in a closed position to enclose an article to be carried, end portions of the shells combining to define tapered end portions of the carrier;

two pairs of ring seal halves, one of each pair being attached to a respective one of the shells for engagement with the other of the pair with the shells in the closed position, the ring seal halves being spaced from respective end portions of the carrier and proportioned for guiding the carrier in the tube system and for limiting air seepage past the carrier, each of the ring seal halves including labyrinth ends for interengagement with corresponding labyrinth ends of a corresponding one of the other ring seal halves for better air sealing;

hinge means coupled to the shells for transverse relative movement of the shells to move the shells between the closed position and an open position providing access into the carrier transversely between the shells, the axis of the hinge means being offset circumferentially from abutting faces of the shells with the shells in the closed position whereby when the carrier is opened the labyrinth ends separate without being subjected to bending stresses from contact with the shells; and closure means operable to secure the shells in the closed position and to release the shells for moving the shells into the open position.

2. A carrier as claimed in claim 1 in which the closure means comprises: a lock coupled to the first shell; a lock bar rotatably coupled to the first shell; and means operably coupling the lock to the lock bar whereby rotational movement at the lock is transmitted to the lock bar, the lock bar including means adapted to engage the second shell upon moving the lock to retain the shells in the closed position, said engagement means being movable to release the second shell upon again moving the lock to rotate the lock bar.

3. A carrier as claimed in claim 1 and further comprising a pair of bumpers positioned one at each end of the carrier.

4. A carrier as claimed in claim 1 in which the closure means comprises:

a first spring latch, the latch comprising a leaf spring attached by a first of its ends to the first shell; and a radial projection attached to the other end of the leaf spring, the second shell defining an opening for receiving the radial projection with the shells in the closed position whereby the shells are retained in this position, the latch being releasable by applying an inward radial force on the radial projection to move the projection out of the opening whereupon the shells can be moved into the open position; and a second spring latch similar to the first spring latch and attached to the second shell, there being an opening formed in the first shell for cooperating with a second spring latch whereupon when the carrier is closed, the first and second spring latches are engaged in the respective openings in the second and first shells to retain the carrier in the closed position.

5. A carrier as claimed in claim 1 and further comprising axially extending webs attached to the shells in said tapered end portions of the carrier to locate longer loads and to absorb shocks created when heavier loads move axially within the carrier.

6. A carrier for transporting articles through tubes of a pneumatic tube system, the carrier being generally cylindrical and disposed about a longitudinal axis, the carrier comprising:

first and second shells for engagement one with the other in a closed position to enclose an article to be carried, end portions of the shells combining to define tapered end portions of the carrier;

two pairs of ring seal halves, one of each pair being attached to a respective one of the shells for engagement with the other of the pair with the shells in the closed position, the ring seal halves being spaced from respective end portions of the carrier and proportioned for guiding the carrier in the tube system and for limiting air seepage past the carrier, hinge means coupled to the shells for transverse relative movement of the shells to move the shells between the closed position and an open position providing access into the carrier transversely between the shells;

the shells having mating edges remote from the hinge means for abutment with the shells in the closed position, the mating edges each being defined by respective recesses and projections extending across the width of said edges adapted to interengage upon closing the carrier and to prevent closing the carrier should an article in the carrier become lodged between these edges to thereby indicate that the article is not properly contained in the carrier;

closure means operable to secure the shells in the closed position and to release the shells for moving the shells into the open position.

7. A carrier as claimed in claim 6 in which the closure means comprises:

a first spring latch, the latch comprising a leaf spring attached by a first of its ends to the first shell; and a radial projection attached to the other end of the leaf spring, the second shell defining an opening for receiving the radial projection with the shells in the closed position whereby the shells are retained in this position, the latch being releasable by applying an inward radial force on the radial projection to move the projection out of the opening whereupon the shells can be moved into the open position; and a second spring latch similar to the first spring latch and attached to the second shell, there being an opening formed in the first shell for cooperating with a second spring latch whereupon when the carrier is closed, the first and second spring latches are engaged in the respective openings in the second and first shells to retain the carrier in the closed position.

8. A carrier as claimed in claim 6 in which the closure means comprises: a lock coupled to the first shell; a lock bar rotatably coupled to the first shell; and means operably coupling the lock to the lock bar whereby rotational movement at the lock is transmitted to the lock bar, the lock bar including means adapted to engage the second shell upon moving the lock to retain the shells in the closed position, said engagement means being movable to release the second shell upon again moving the lock to rotate the lock bar.

9. A carrier as claimed in claim 6 and further comprising axially extending webs attached to the shells in said tapered end protions of the carrier to locate longer loads and to absorb shocks created when heavier loads move axially within the carrier.

* * * * *